(12) United States Patent
Zhang et al.

(10) Patent No.: US 12,481,157 B2
(45) Date of Patent: Nov. 25, 2025

(54) TUNABLE TRANSPARENT ANTENNAS IMPLEMENTED ON LENSES OF AUGMENTED-REALITY DEVICES

(71) Applicant: META PLATFORMS TECHNOLOGIES, LLC, Menlo Park, CA (US)

(72) Inventors: Ce Zhang, Campbell, CA (US); Yonghua Wei, San Diego, CA (US); Bruno Cendon Martin, Palo Alto, CA (US); Brian Toleno, Cupertino, CA (US); Geng Ye, Union City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 878 days.

(21) Appl. No.: 17/734,438

(22) Filed: May 2, 2022

(65) Prior Publication Data

US 2023/0067343 A1 Mar. 2, 2023

Related U.S. Application Data

(60) Provisional application No. 63/238,461, filed on Aug. 30, 2021.

(51) Int. Cl.
*G02B 27/01* (2006.01)
*G06F 3/01* (2006.01)
*G06T 19/00* (2011.01)
*H01Q 19/06* (2006.01)

(52) U.S. Cl.
CPC ........ *G02B 27/0172* (2013.01); *G06F 3/013* (2013.01); *G06T 19/006* (2013.01); *H01Q 19/06* (2013.01); *G02B 2027/0178* (2013.01)

(58) Field of Classification Search
CPC ........ G02B 27/0172; G02B 2027/0178; G06F 3/013; H01Q 1/273; H01Q 9/30
See application file for complete search history.

(56) References Cited

U.S. PATENT DOCUMENTS

| | | | |
|---|---|---|---|
| 8,096,654 | B2 | 1/2012 | Amirparviz et al. |
| 9,547,335 | B1 | 1/2017 | Bevelacqua et al. |
| 9,823,737 | B2 | 11/2017 | Mazed et al. |

(Continued)

FOREIGN PATENT DOCUMENTS

CA 2258447 A1 1/1996

OTHER PUBLICATIONS

International Search report and Written Opinion for International Application No. PCT/US2022/041890, mailed Dec. 6, 2022, 13 pages.

(Continued)

*Primary Examiner* — Ryan D Howard
(74) *Attorney, Agent, or Firm* — Greenberg Traurig, LLP

(57) ABSTRACT

An AR device comprising (1) a frame dimensioned to be worn on a head of a user and (2) a lens stack coupled to the frame and positioned in an optical path of the user such that the user is able to see through at least a portion of the lens stack, wherein the lens stack comprises (A) a lens, (B) an optical waveguide that (I) is configured to display computer-generated content to the user and (II) is at least partially aligned with the lens, and (C) a radio-frequency antenna disposed on the lens. Various other apparatuses, devices, systems, and methods are also disclosed.

19 Claims, 12 Drawing Sheets

(56) References Cited

U.S. PATENT DOCUMENTS

| | | |
|---|---|---|
| 10,175,490 B1 | 1/2019 | Serdarevic et al. |
| 11,029,535 B2 | 6/2021 | Miller et al. |
| 2016/0270656 A1 | 9/2016 | Samec et al. |
| 2017/0042480 A1 | 2/2017 | Gandhi et al. |
| 2019/0033622 A1* | 1/2019 | Olgun .................. H04B 1/385 |
| 2020/0026087 A1 | 1/2020 | Cai et al. |
| 2020/0096772 A1* | 3/2020 | Adema ................ G02B 6/0016 |
| 2021/0031051 A1 | 2/2021 | Kubota et al. |
| 2021/0132689 A1 | 5/2021 | Yudanov et al. |
| 2021/0219147 A1 | 7/2021 | Mizunuma et al. |

OTHER PUBLICATIONS

Silva Z.J., "Optically Transparent Antennas for Multi-Modal Sensing," In Partial Fulfillment of the Requirements for the Degree Master of Science in the School of Electrical and Computer Engineering, Georgia Institute of Technology, May 2019, 147 pages.
International Preliminary Report on Patentability for International Application No. PCT/US2022/041890, mailed Mar. 14, 2024, 9 pages.

* cited by examiner

TUNABLE TRANSPARENT ANTENNAS IMPLEMENTED ON LENSES OF AUGMENTED-REALITY DEVICES

INCORPORATION BY REFERENCE

This application claims the benefit of priority under 35 U.S.C. § 119(e) to U.S. Provisional Application No. 63/238,461 filed Aug. 30, 2021, the contents of which are incorporated herein by reference in their entirety.

BRIEF DESCRIPTION OF DRAWINGS

The accompanying drawings illustrate a number of exemplary embodiments and are parts of the specification. Together with the following description, the drawings demonstrate and explain various principles of the instant disclosure.

Figure 1:
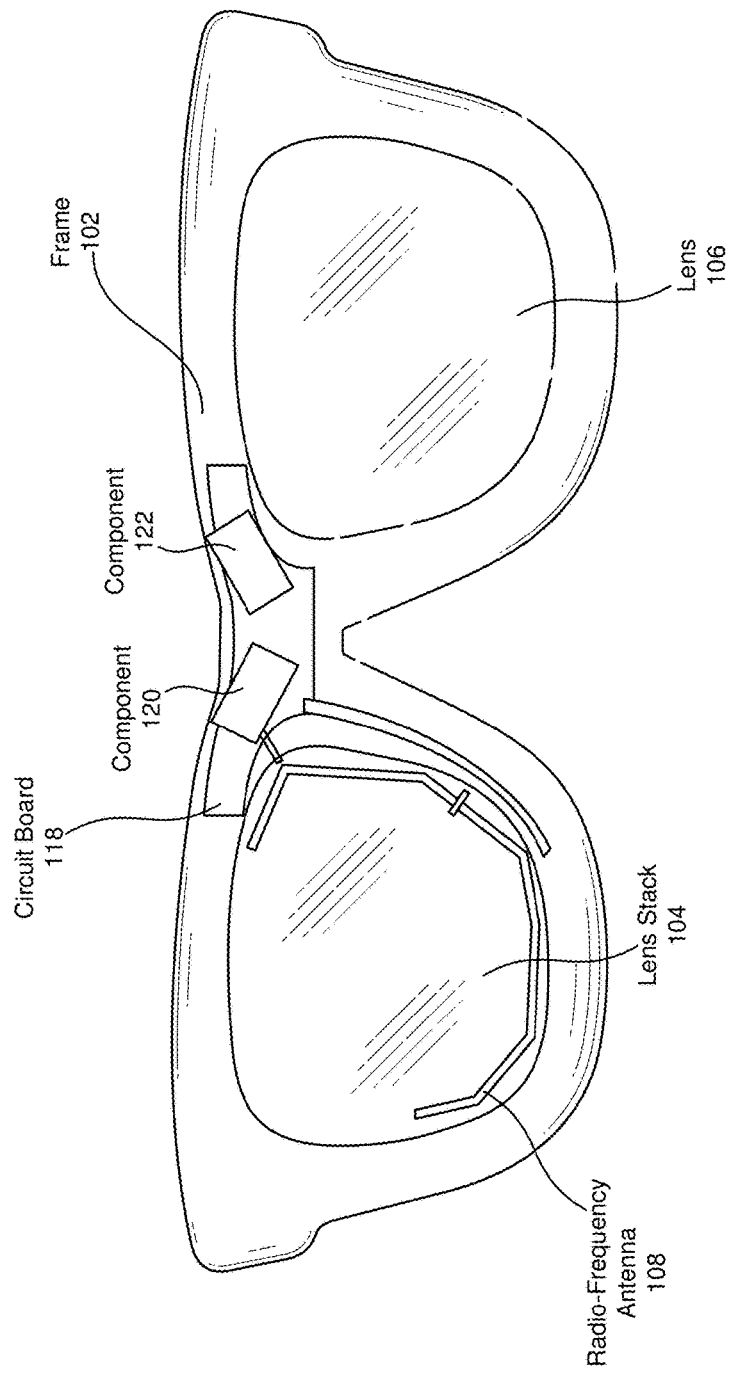
FIG. 1 is an illustration of an exemplary augmented-reality device that includes a tunable transparent antenna implemented on lenses according to one or more embodiments of this disclosure.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION

The present disclosure is generally directed to tunable transparent antennas implemented on lenses of augmented-reality (AR) devices. As will be explained in greater detail below, these tunable transparent antennas and corresponding systems may provide numerous features and benefits.

AR glasses may constitute and/or represent a next generation computing platform worn on the face of consumers for everyday use. In such AR glasses, structural reliability may be both challenging and/or imperative for longevity and/or operability. The chance of mechanical damage may be much higher for such AR glasses than many other electronics (e.g., cellphones, tablets, and/or laptops).

In some situations, the front frame of AR glasses may have the highest chance of breaking (e.g., if the user drops the glasses onto the ground). For at least this reason, to achieve high structural reliability, the front frame of AR glasses may be made of metallic and/or composite materials such as magnesium alloy, carbon fiber composite, and/or titanium. Unfortunately, these materials may be radio-frequency (RF) opaque and/or may block antenna radiation, thus preventing and/or discouraging the placement of certain RF components (such as antennas) behind the metallic and/or composite materials that form the front frame of the AR glasses. Besides, any RF window (e.g., a window replaced with and/or formed by RF transparent material to support the transfer of RF radiation) on the front frame of the AR glasses may affect the structural stiffness and/or reliability as well as the cosmetic design.

In some examples, when a printed circuit board (PCB) with an RF integrated circuit (RFIC) is placed inside a front frame, an antenna may also be placed in the front frame to minimize the cable loss between the antenna and the RFIC pin out. Unfortunately, AR designers and/or engineers may be faced with certain tradeoffs and/or design constraints pertaining to the structural integrity and/or RF transparency of the AR glasses. For instance, such AR designers and/or engineers may need to decide whether to maintain and/or reinforce front frames with structurally reliable materials that block antenna radiation or to provide RF transparency through front frames with less structurally reliable materials. The instant disclosure, therefore, identifies and addresses a need for tunable transparent antennas implemented on lenses of AR glasses.

As will be discussed in greater detail below, the lens region of AR glasses may consist of several layers in an optical stack. One solution to avoid the tradeoffs and/or design constraints mentioned above may be to create a transparent thin film with embedded transparent conductive antenna traces attached to the user-facing side of a lens. This solution may open up brand new real estate for antenna implementations. In one example, an antenna layer may be a transparent thin film equipped with a Board-to-Board (B2B) connector communicatively coupled to an RFIC pin out on the main PCB via a short coax cable. In this example, the B2B connector fitted on the antenna's transparent thin film may be located in the extended region of a front frame outside the water seal on AR glasses.

In this location of the front frame, the B2B connector may be invisible to users. The B2B connector fitted on the thin film may be plugged and/or inserted into a corresponding B2B connector fitted on the main PCB and/or may have the RF feed to the RFIC input/output signal trace implemented on the main PCB. The antenna implemented on the thin film may take the form of a loop, ring, and/or monopole topology along the edge of the lens to minimize the blockage of a user's eyesight as much as possible. Although the antenna is highly transparent, so-called transparent antennas may not necessarily exhibit 100% optical transmittance.

The following will provide, with reference to FIGS. 1-6 and 8, detailed descriptions of exemplary devices, systems, components, and corresponding implementations for tunable transparent antennas implemented on lenses of AR glasses. In addition, detailed descriptions of methods for tunable transparent antennas implemented on lenses of AR glasses in connection with FIG. 7. The discussion corresponding to FIGS. 9-12 will provide detailed descriptions of types of exemplary artificial-reality devices, wearables, and/or associated systems capable of implementing tunable transparent antennas on lenses.

FIG. 1 illustrates an exemplary AR device 100 that includes and/or represents a frame 102 and a lens stack 104. In some examples, AR device 100 may include and/or represent glasses that integrate real and/or virtual features or elements for viewing by a user. In such examples, frame 102 may be dimensioned to be worn on and/or mounted to the user's head. As illustrated in FIG. 1, lens stack 104 may be coupled and/or secured to frame 102. In one example, lens stack 104 may be positioned and/or placed in an optical path of the user. In this example, the positioning and/or placement of lens stack 104 in the optical path may enable the user to see through at least a portion of lens stack 104 when frame 102 is worn on and/or mounted to the head of the user.

In some examples, lens stack 104 may include and/or represent various optical and/or RF components that facilitate and/or support one or more features or functionalities of AR device 100. For example, lens stack 104 may include and/or represent one or more lenses, one or more optical waveguides, and/or one or more RF antennas disposed on the one or more lenses. In one example, each optical waveguide may be configured to display and/or present computer-generated content to the user. In this example, each optical waveguide may be at least partially aligned with a corresponding lens of AR device 100 to support and/or facilitate viewing of such computer-generated content in the user's optical path.

In some examples, AR device 100 may include and/or represent one or more additional optical components besides frame 102 and/or lens stack 104. For example, AR device 100 may include and/or represent a lens 106 coupled and/or secured to frame 102 alongside and/or proximate to lens stack 104. In this example, lens 106 may include and/or represent any of the same features and/or components as lens stack 104. Additionally or alternatively, lens 106 may exclude and/or omit certain features and/or components included in lens stack 104.

In some examples, AR device 100 may include and/or represent an RF antenna incorporated in and/or applied to lens stack 104. For example, RF antenna 108 may be disposed on a lens included in and/or forming part of lens stack 104. In one example, RF antenna 108 may be positioned and/or placed along a perimeter of a see-through area of the lens via a transparent thin film. In this example, the transparent thin film may be coupled and/or attached to the side of the lens that faces the user by way of an adhesive.

In some examples, AR device 100 may include and/or represent a circuit board 118 embedded and/or installed in frame 102. In one example, RF antenna 108 may be communicatively coupled to at least one component disposed on circuit board 118 via a B2B connector attached to the transparent thin film. For example, AR device 100 may include and/or represent a component 120 and a component 122 soldered and/or coupled to circuit board 118. In this example, one or more B2B connectors fitted and/or equipped on the transparent thin film and/or circuit board 118 may enable RF antenna 108 to form and/or establish communicative and/or electrical continuity with component 120 and/or component 122.

In some examples, AR device 100 may refer to and/or represent any type of display and/or visual device that is worn on and/or mounted to a user's head or face. In one example, AR device 100 may include and/or represent a pair of AR glasses designed to be worn on and/or secured to a user's head or face. In one example, AR device 100 may include and/or incorporate lenses that form a display screen and/or corresponding partially see-through areas. Additionally or alternatively, AR device 100 may include and/or incorporate one or more cameras directed and/or aimed toward the user's line of sight and/or field of view.

In some examples, AR device 100 may achieve and/or establish one or more links, connections, and/or channels of communication with one or more additional and/or remote computing devices via RF antenna 108. For example, AR device 100 may be able to communicate with a compatible cellular network and/or one or more computing devices located proximate to and/or remotely from the user. Additionally or alternatively, RF antenna 108 may achieve, support, facilitate, and/or establish radio communication (e.g., Bluetooth communication, WiFi communication, cellular communication, etc.) between AR device 100 and one or more additional devices.

In some examples, frame 102 may be sized and/or shaped in any suitable way to fit on and/or mount to the head and/or face of a user. In one example, frame 102 may be opaque to radio frequencies and/or visible light. Frame 102 may include and/or contain any of a variety of different materials. For example, frame 102 may be made of magnesium alloy, carbon fiber composite, and/or titanium. Additional examples of such materials include, without limitation, metals, coppers, aluminums, steels, silvers, golds, platinums, plastics, ceramics, polymers, composites, rubbers, nylons, polycarbonates, variations or combinations of one or more of the same, and/or any other suitable materials.

In some examples, lens stack 104 and/or lens 106 may be sized and/or shaped in any suitable way to fit in and/or secure to frame 102. In one example, lens stack 104 and/or lens 106 may include and/or represent a prescription and/or corrective lens intended to correct and/or mitigate one or more refractive errors or imperfections in the user's vision. Lens stack 104 and/or lens 106 may include and/or contain any of a variety of different materials. Examples of such materials include, without limitation, plastics, glasses (e.g., crown glass), polycarbonates, combinations or variations of one or more of the same, and/or any other suitable materials.

Figure 6:
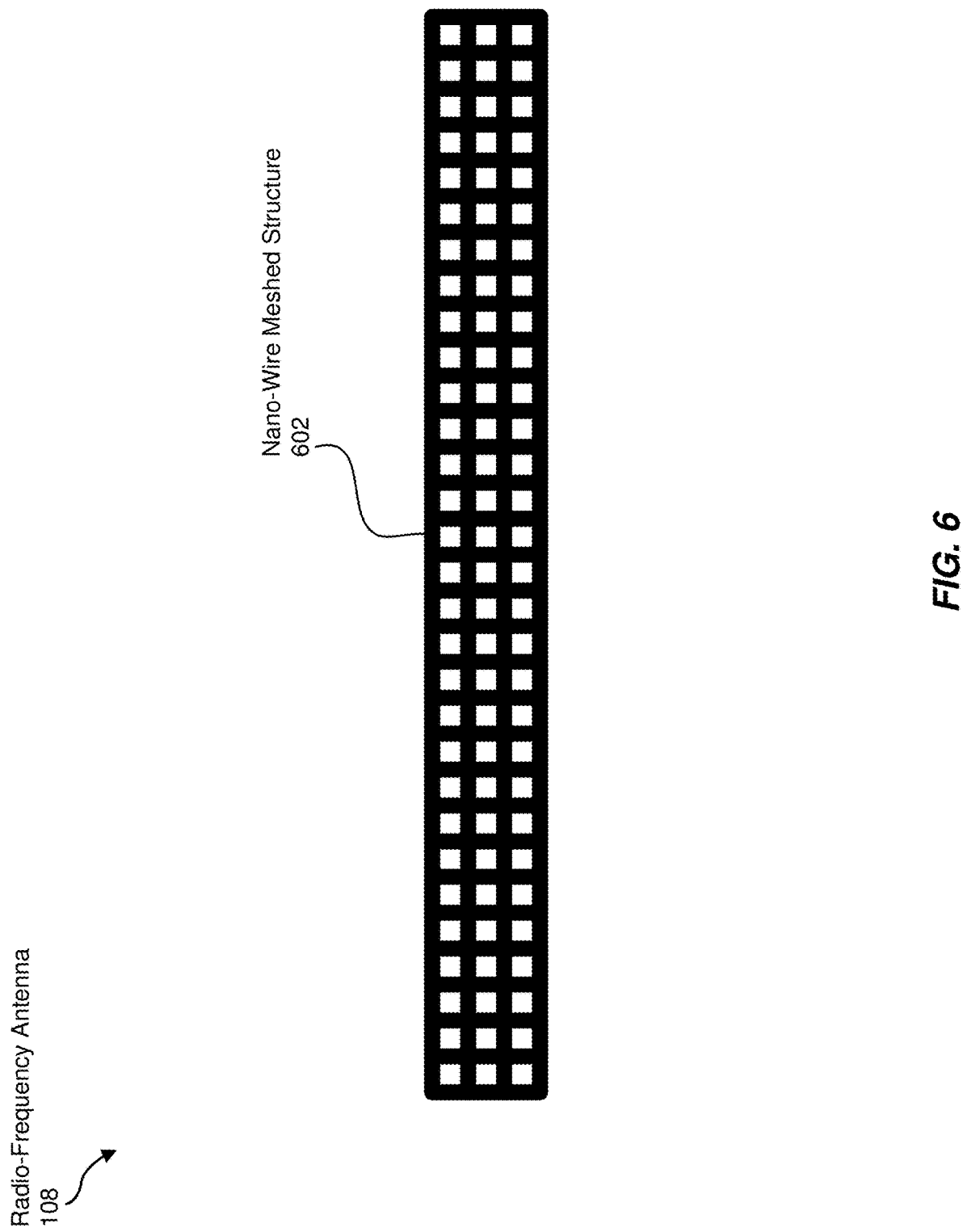
FIG. 6 is an illustration of an exemplary radio-frequency antenna with a nano-wire meshed structure according to one or more embodiments of this disclosure.

In some examples, RF antenna 108 may be sized and/or shaped in any suitable way for disposal and/or application on lens stack 104 with aims of achieving high degrees of RF functionality and/or optical transmittance or transparency. In such examples, the size and/or shape of RF antenna 108 may affect its ability to transmit and/or receive communications via certain frequencies. For example, and as illustrated in FIG. 6, RF antenna 108 may include and/or represent a nano-wire meshed structure 602 that is at least partially optically transmissible (especially relative to the visual and/or AR experience of the user). In this example, nano-wire meshed structure 602 may be disposed on and/or applied to lens stack 104 and/or lens 106 to achieve RF antenna 108. Additionally or alternatively, RF antenna 108 may include and/or represent a loop antenna topology, a ring antenna topology, and/or a monopole antenna topology. RF antenna 108 may include and/or contain any of a variety of different materials. Examples of such materials include, without limitation, metals, coppers, aluminums, steels, stainless steels, silvers, golds, variations or combinations of one or more of the same, and/or any other suitable materials.

In some examples, circuit board 118 may be sized and/or shaped in any suitable way for placement and/or insertion within frame 102. In one example, circuit board 118 may include and/or represent insulating material that facilitates mounting (e.g., mechanical support) and/or interconnection (e.g., electrical coupling) of electrical and/or electronic components. For example, circuit board 118 may include and/or represent one or more PCBs shaped and/or contoured for installation within the front frame of frame 102. Examples of circuit board 118 include, without limitation, single-sided boards, double-sided boards, multilayer boards, motherboards, variations or combinations of one or more of the same, and/or any other suitable type of circuit board.

In some examples, components 120 and 122 may be sized and/or shaped in any suitable way for attachment to and/or installation on circuit board 118. In one example, components 120 and 122 may include and/or represent integrated circuits that facilitate and/or support RF communications and/or AR content. For example, component 120 may include and/or represent an RFIC, and/or component 122 may include and/or represent a processing device (e.g., a central processing unit). Additional examples of components 120 and 122 include, without limitation, circuitry, transistors, resistors, capacitors, diodes, transceivers, sockets, wiring, circuit boards, power sources, batteries, cabling, connectors, processors, memory devices, modems, variations or combinations of one or more of the same, and/or any other suitable components.

In some examples, AR device 100 may include and/or represent one or more additional components, devices, and/or mechanisms that are not necessarily illustrated and/or labelled in FIG. 1. For example, AR device 100 may include and/or represent one or more processors and/or memory devices that are not necessarily illustrated and/or labelled in FIG. 1. Such processors may include and/or represent any type or form of hardware-implemented processing device capable of interpreting and/or executing computer-readable instructions. In one example, such processors may access, modify, and/or execute certain software and/or firmware modules in connection with computer-generated content and/or RF communications. Examples of such processors include, without limitation, physical processors, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable processing devices.

In some examples, AR device 100 may include and/or represent one or more memory devices that store software and/or firmware modules or data that facilitate and/or support AR displays and/or presentations, RF communications, and/or corresponding computing tasks. Such memory devices may include and/or store computer-executable instructions that, when executed by processors, cause the processors to perform one or more tasks in connection with tunable transparent antennas implemented on lenses of AR glasses.

In some examples, such memory devices may include and/or represent any type or form of volatile or non-volatile storage device or medium capable of storing data and/or computer-readable instructions. In one example, such memory devices may store, load, and/or maintain one or more modules and/or trained inferential models that perform certain tasks, classifications, and/or determinations in connection with AR content and/or RF communications. Examples of such memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

In some examples, although not necessarily illustrated and/or labelled in this way in FIG. 1, AR device 100 may include and/or represent additional circuitry, transistors, resistors, capacitors, diodes, transceivers, sockets, wiring, circuit boards, power sources, batteries, cabling, and/or connectors, among other components. Additionally or alternatively, AR device 100 may exclude and/or omit one or more of the components, devices, and/or mechanisms that are illustrated and/or labelled in FIG. 1. For example, in alternative implementations, AR device 100 may exclude and/or omit component 122.

Figure 2:
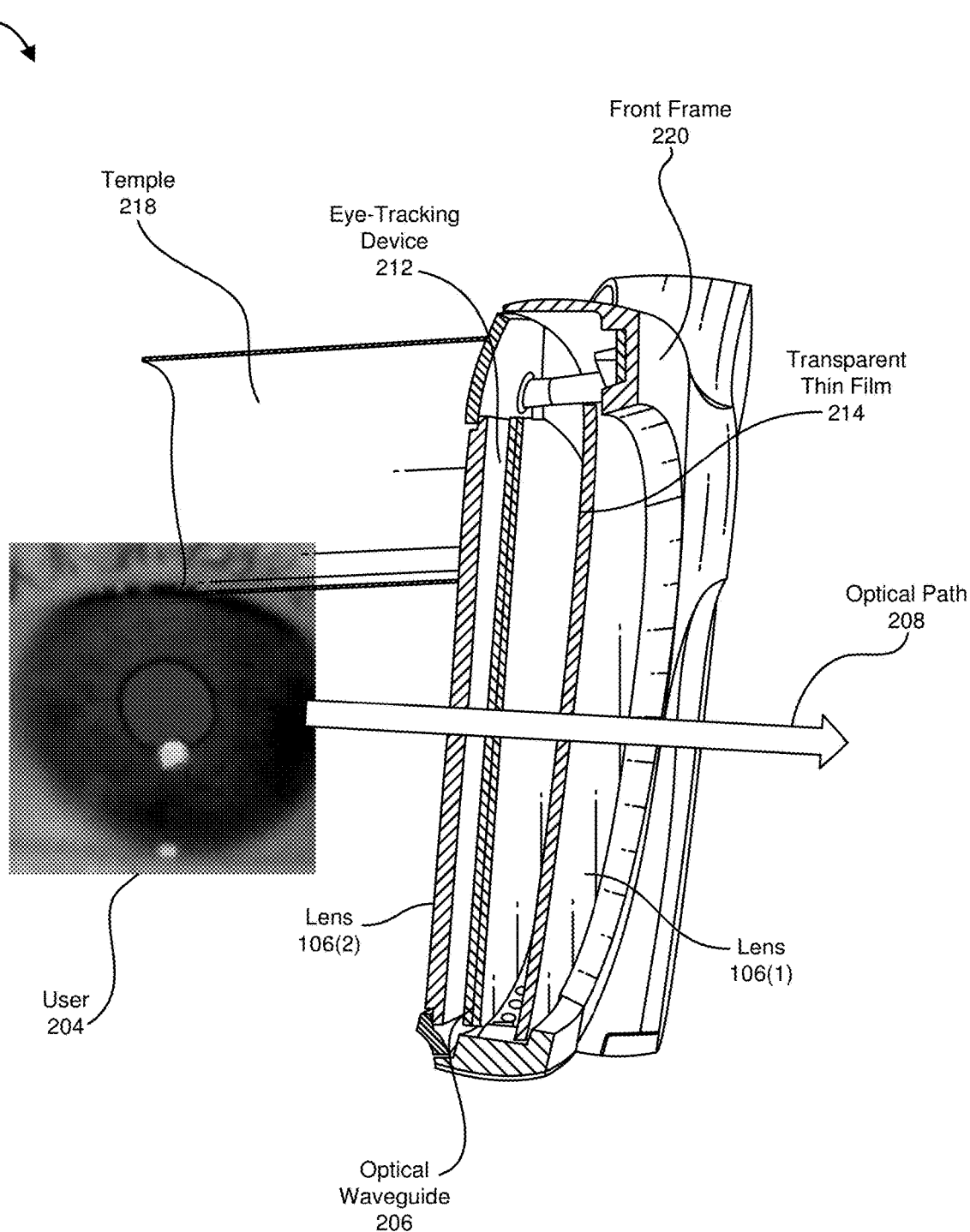
FIG. 2 is an illustration of an exemplary augmented-reality device that includes a tunable transparent antenna implemented on lenses according to one or more embodiments of this disclosure.

FIG. 2 illustrates a cross section of exemplary AR device 100. In some examples, frame 102 of AR device 100 may include and/or represent a front frame 220 and a temple 218. In such examples, lens stack 104 may include and/or represent a pair of lenses 106(1) and 106(2), an optical waveguide 206, an eye-tracking device 212, and/or a transparent thin film 214. In one example, lenses 106(1) and 106(2), optical waveguide 206, eye-tracking device 212, and/or transparent thin film 214 may be positioned in an optical path 208 of a user 204 who is wearing AR device 100. With lens stack 104 in this position, user 204 may be able to see through at least a portion of lens stack 104 via optical path 208.

In some examples, optical waveguide 206 may be configured to display computer-generated content to user 204. In one example, optical waveguide 206 may be at least partially aligned with lenses 106(1) and 106(2) along optical path 208. As illustrated in FIG. 2, lens 106(2) may be positioned closer to the head of the user relative to lens 106(1). Put differently, lens 106(1) may be positioned further from the head of the user relative to lens 106(2).

In some examples, optical waveguide 206 may be positioned and/or placed between lenses 106(1) and 106(2) within lens stack 104. In one example, RF antenna 108 may be disposed and/or coupled along a perimeter of a see-through area of lens 106(1) via transparent thin film 214. For example, RF antenna 108 may be laid out and/or arranged on transparent thin film 214. In this example, transparent thin film 214 may be coupled and/or attached to lens 106(1) via an adhesive.

In some examples, transparent thin film 214 may be coupled and/or attached to the side of lens 106(1) that faces user 204 (e.g., the internal side of the lens). Additionally or alternatively, transparent thin film 214 may be coupled and/or attached to the side of lens 106(1) that faces the outside world (e.g., the external side of the lens).

In some examples, eye-tracking device 212 may include and/or represent one or more sensors coupled and/or secured to lens 106(2) via a transparent thin film. For example, the sensors of eye-tracking device 212 may be laid out and/or arranged on the transparent thin film. In this example, the transparent thin film may couple and/or attach the sensors of eye-tracking device 212 to lens 106(2) via an adhesive.

In some examples, eye-tracking device 212 may be coupled and/or attached to the side of lens 106(2) that faces optical waveguide 206 (e.g., the internal side of the lens). Additionally or alternatively, eye-tracking device 212 may be coupled and/or attached to the side of lens 106(2) that faces user 204 (e.g., the external side of the lens).

Figure 3:
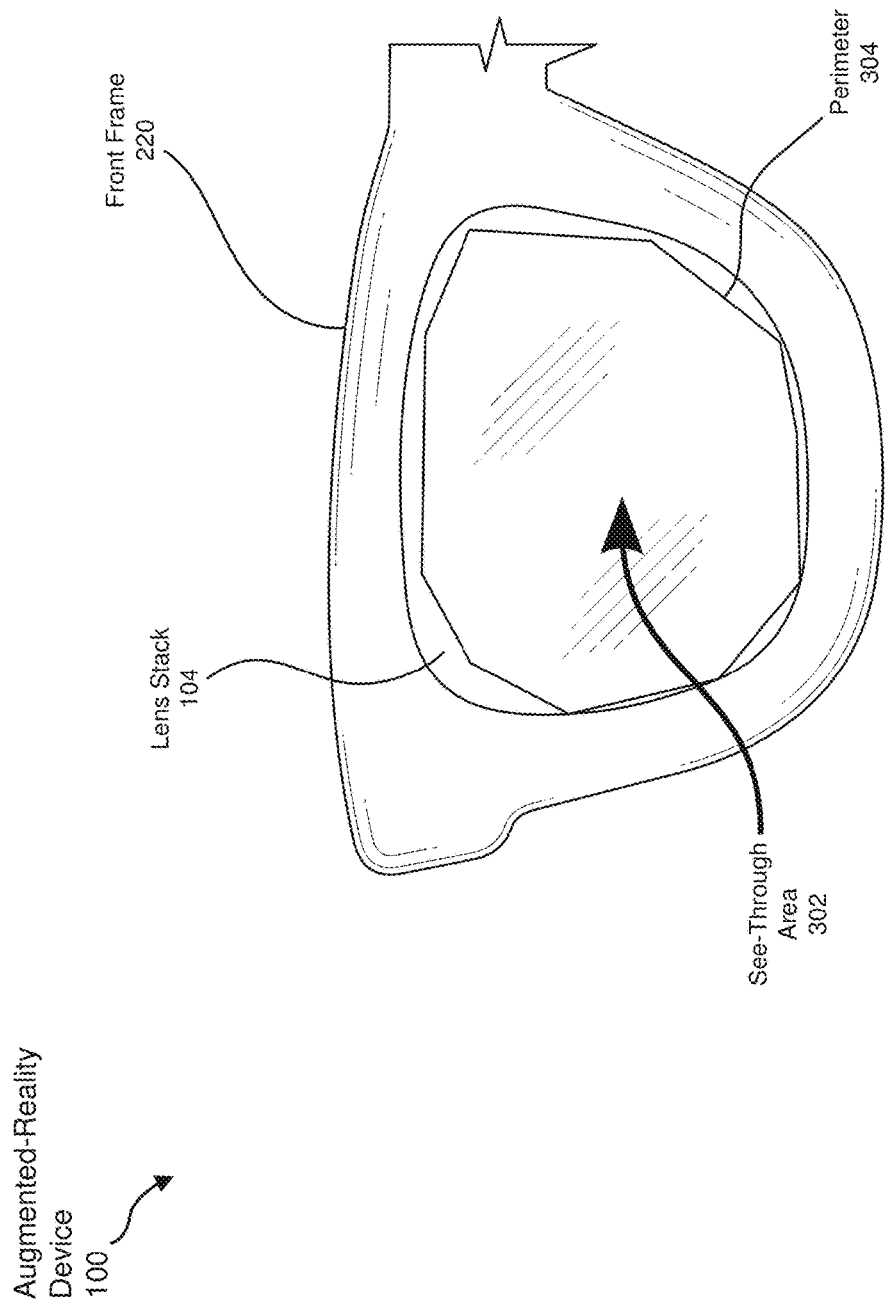
FIG. 3 is an illustration of an exemplary augmented-reality device that includes a tunable transparent antenna implemented on lenses according to one or more embodiments of this disclosure.

FIG. 3 illustrates an implementation of exemplary AR device 100. In some examples, AR device 100 may include and/or represent RF antenna 108 disposed and/or applied along a perimeter 304 of a see-through area 302 of lens stack 104. With RF antenna 108 disposed and/or applied along perimeter 304, the visual impact of RF antenna 108 may be mitigated and/or minimized to user 204. Moreover, the optical transmissibility of RF antenna 108 may further mitigate and/or minimize the visual impact on user 204. As a result, RF antenna 108 may, in some implementations, be nearly invisible and/or unnoticeable to the user during operation.

Figure 4:
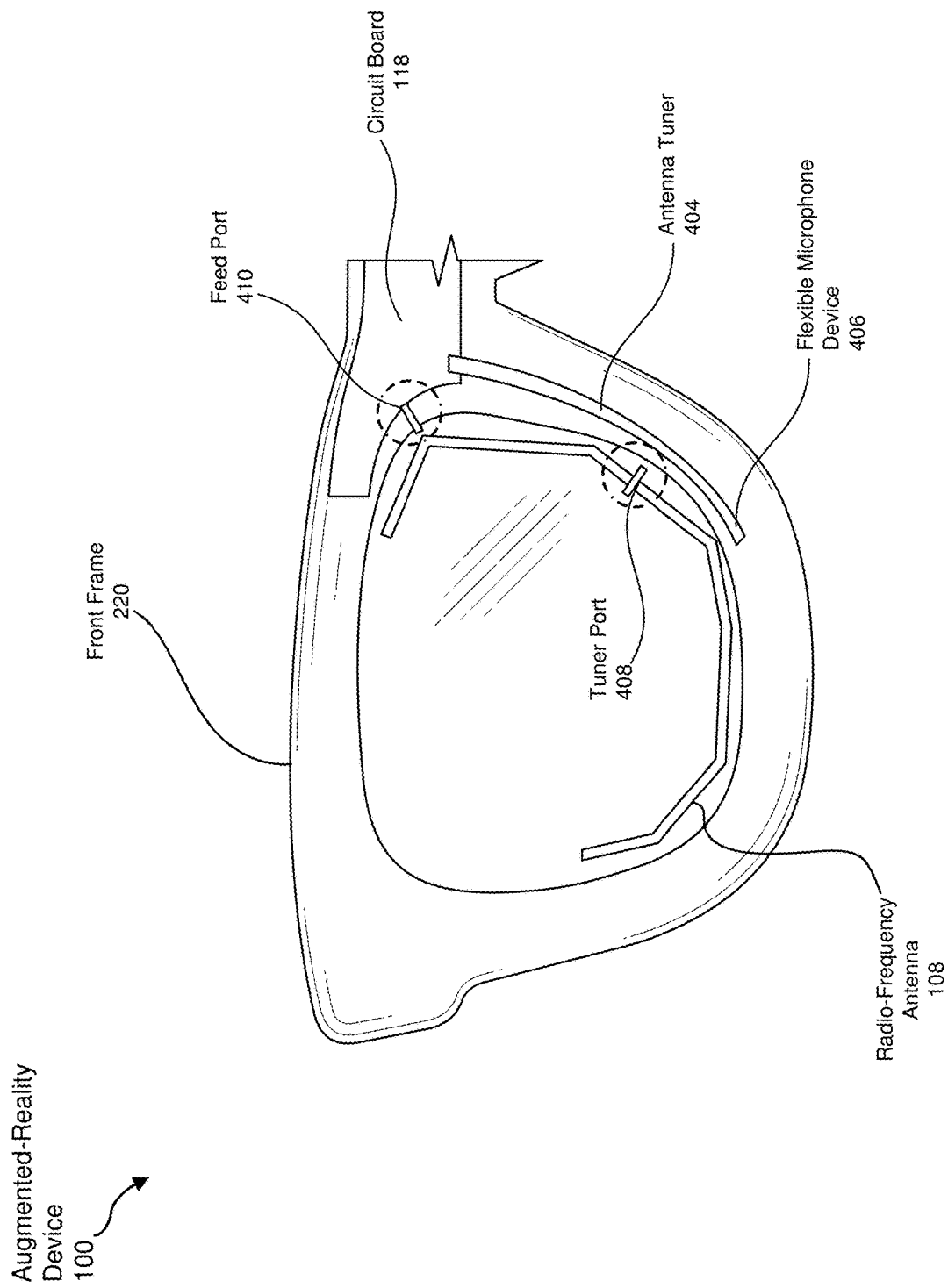
FIG. 4 is an illustration of an exemplary augmented-reality device that includes a tunable transparent antenna implemented on lenses according to one or more embodiments of this disclosure.

FIG. 4 illustrates an implementation of exemplary AR device 100. In some examples, AR device 100 may include and/or represent RF antenna 108 disposed and/or applied along perimeter 304 of see-through area 302 of lens stack 104. As illustrated in FIG. 4, AR device 100 may also include and/or represent a flexible microphone device 406. In some examples, flexible microphone device 406 may be configured to detect, capture, and/or record audio from user 204 during operation of AR device 100. In one example, flexible microphone device 406 may be shaped and/or positioned to follow the contours of lens stack 104, a portion of front frame 220, and/or the nose of user 204.

In some examples, AR device 100 may additionally include and/or represent an antenna tuner 404 communicatively coupled between RF antenna 108 and a modem (not necessarily illustrated and/or labelled in FIG. 4) disposed on circuit board 118. In such examples, antenna tuner 404 may facilitate and/or support tuning RF antenna 108 to certain frequencies, thus enabling RF antenna 108 to transmit and/or receive communications via different frequencies. In one example, antenna tuner 404 may be incorporated and/or integrated into flexible microphone device 406. Additionally or alternatively, AR device 100 may include and/or represent an antenna feed communicatively coupled between RF antenna 108 and an RF circuit disposed on circuit board 118. In one example, RF antenna 108 may include and/or represent a tuner port 408 communicatively coupled to antenna tuner 404. In this example, RF antenna 108 may also include and/or represent a feed port 410 communicatively coupled to the antenna feed.

Figure 5:
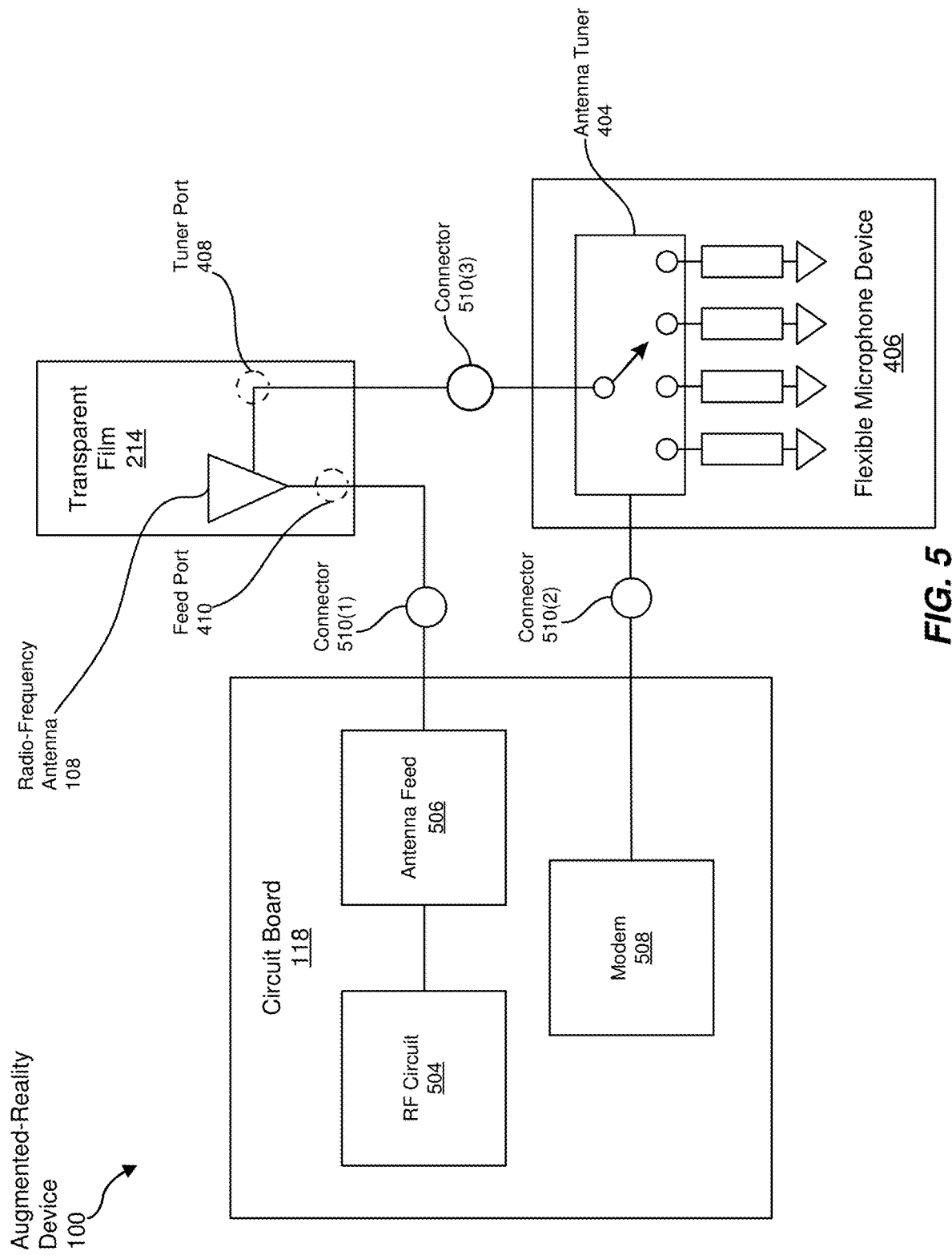
FIG. 5 is an illustration of an exemplary augmented-reality device that includes a tunable transparent antenna implemented on lenses according to one or more embodiments of this disclosure.

FIG. 5 illustrates a schematic view of exemplary AR device 100. As illustrated in FIG. 5, AR device 100 may include and/or represent circuit board 118 communicatively coupled to both RF antenna 108 and flexible microphone device 406. In some examples, circuit board 118 may achieve these communicative couplings with RF antenna 108 and flexible microphone device 406 via a connector 510(1) and a connector 510(2), respectively. Additionally or alternatively, RF antenna 108 and flexible microphone device 406 may be communicatively coupled to one another via a connector 510(3).

In some examples, one or more of connectors 510(1)-(3) may include and/or represent a B2B connector. In one example, one or more of connectors 510(1)-(3) and/or circuit board 118 may be embedded in and/or covered by frame 102 outside the water seal on AR device 100. As illustrated in FIG. 5, circuit board 118 may include and/or represent an RF circuit 504 (e.g., an RFIC), an antenna feed 506, and/or a modem 508. In one example, RF circuit 504 and antenna feed 506 may be communicatively coupled to one another on circuit board 118. In this example, antenna feed 506 may be communicatively coupled to RF antenna 108 via RF connector 510(1) and/or feed port 410.

In some examples, modem 508 may be communicatively coupled to antenna tuner 404 and/or flexible microphone device 406 via connector 510(2). Additionally or alternatively, flexible microphone device 406 may be communicatively coupled to RF antenna 108 via connector 510(3) and/or tuner port 408. As illustrated in FIG. 5, RF antenna 108, feed port 410, and/or tuner port 408 may be implemented and/or disposed on transparent thin film 214. In one example, transparent thin film 214 may be coupled and/or attached to a portion of lens stack 104 and/or lens 106 to support and/or facilitate RF communications without interfering with and/or impacting the user's visual experience via AR device 100.

Figure 8:
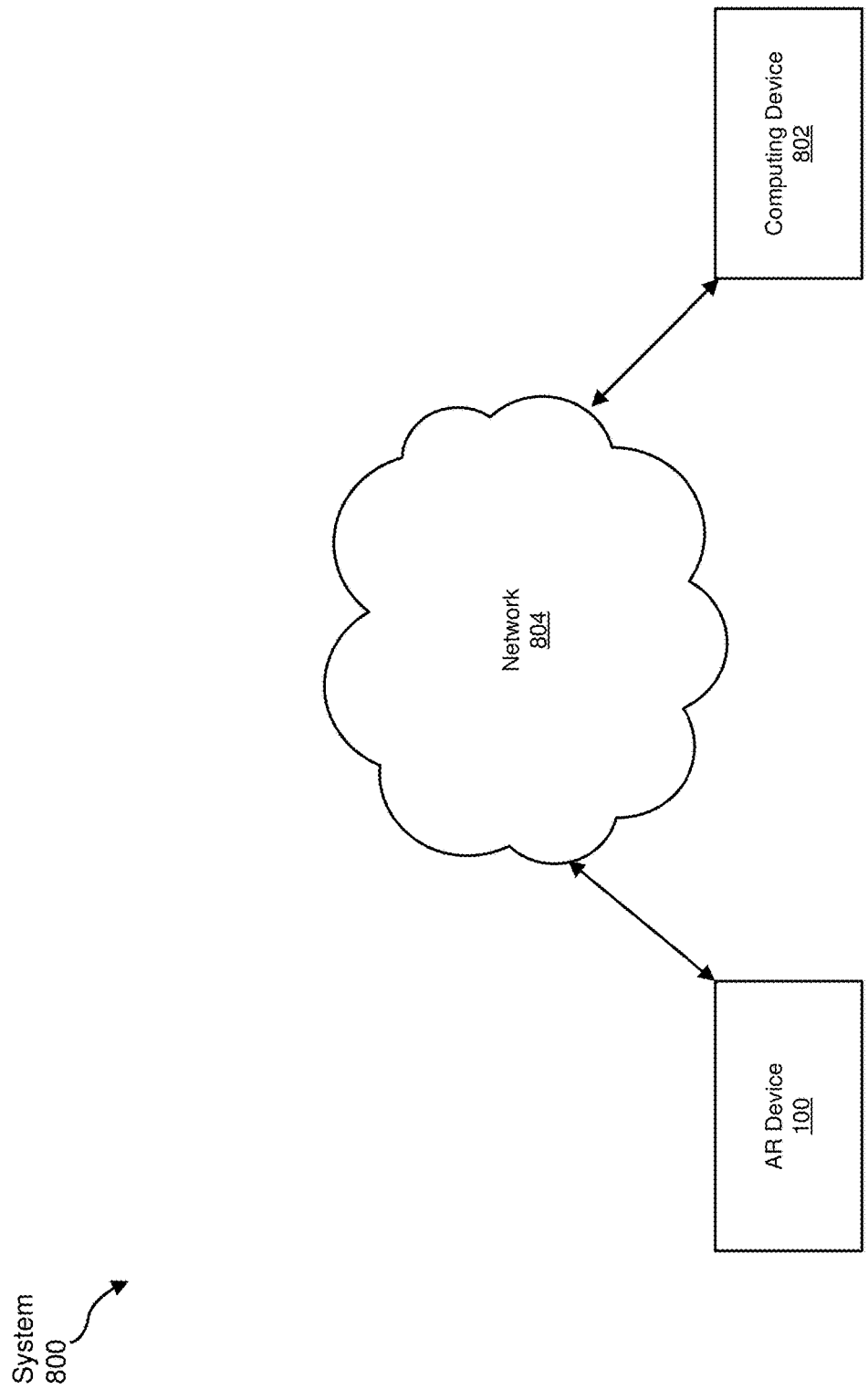
FIG. 8 is an illustration of an exemplary system that includes an augmented-reality device and a computing device in communication with one another via a network according to one or more embodiments of this disclosure.

FIG. 8 illustrates an exemplary system 800 that includes AR device 100 and computing device 802 in communication with one another via a network 804. In some examples, AR device 100 may be able to establish and/or maintain communication and/or data transfer with computing device 802 and/or network 804 via RF antenna 108. Accordingly, the communications exchanged between AR device 100 and computing device 802 may be transmitted and/or received via RF antenna 108.

In some examples, computing device 802 may include and/or represent any type or form of physical computing device capable of reading computer-executable instructions and/or communicating with AR device 100 via network 804. Examples of computing device 802 include, without limitation, routers (such as provider edge routers, hub routers, spoke routers, autonomous system boundary routers, and/or area border routers), switches, hubs, modems, bridges, repeaters, gateways, multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable computing device.

Network 804 generally represents any medium and/or architecture capable of facilitating communication or data transfer. In some examples, network 804 may include and/or represent one or more additional computing devices not illustrated in FIG. 8 that facilitate communication and/or form part of routing paths between AR device 100 and computing device 802. Network 804 may facilitate communication or data transfer using wireless and/or wired connections. Examples of network 804 include, without limitation, an intranet, an access network, a layer 2 network, a layer 3 network, a Multiprotocol Label Switching (MPLS) network, an Internet Protocol (IP) network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 7:
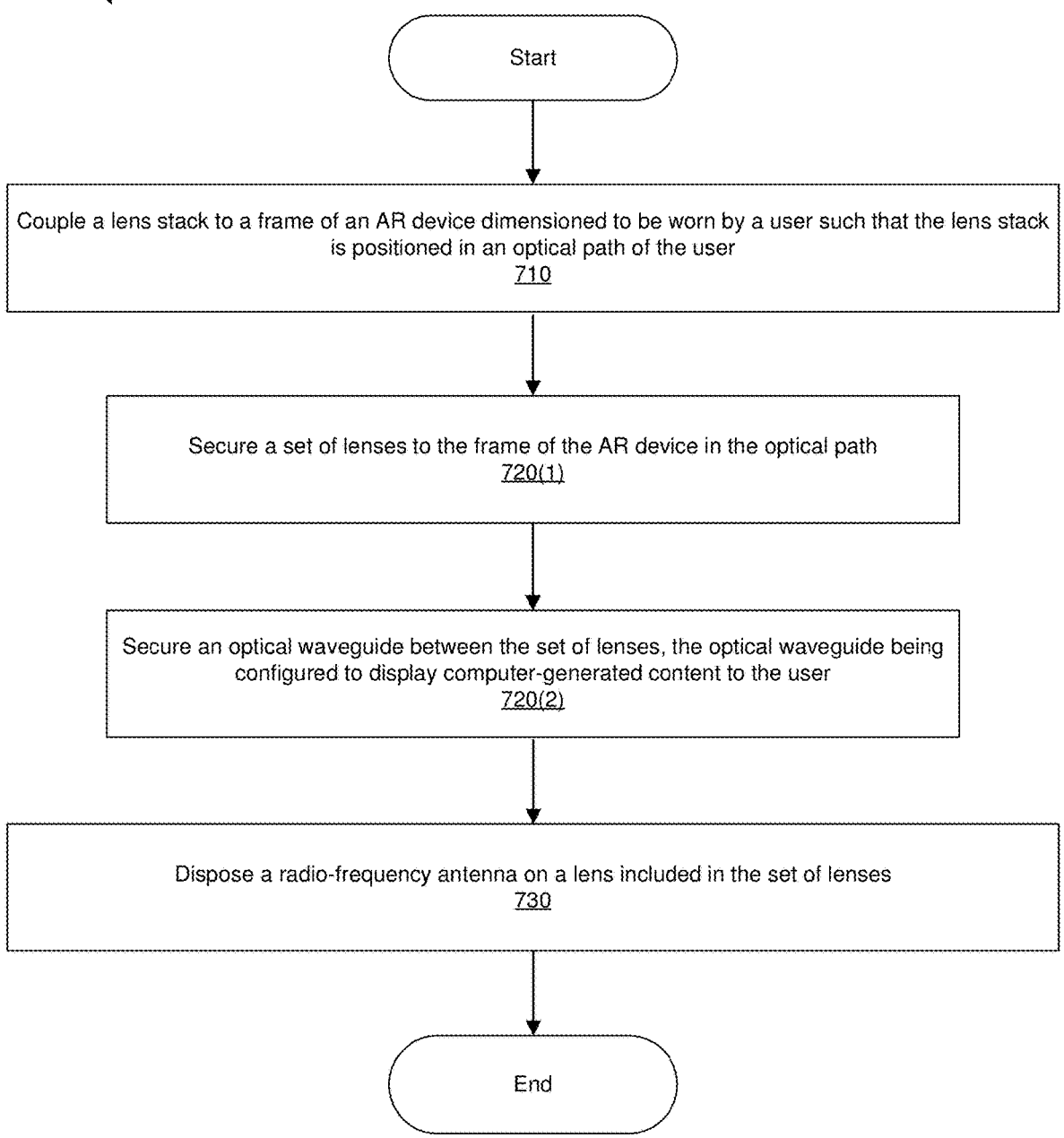
FIG. 7 is a flowchart of an exemplary method for tunable transparent antennas implemented on lenses of AR glasses according to one or more embodiments of this disclosure.

FIG. 7 is a flow diagram of an exemplary method 700 for tunable transparent antennas implemented on lenses of AR glasses. In one example, the steps shown in FIG. 7 may be performed during the manufacture and/or assembly of an artificial-reality system. Additionally or alternatively, the steps shown in FIG. 7 may incorporate and/or involve various sub-steps and/or variations consistent with one or more of the descriptions provided above in connection with FIGS. 1-6 and 8.

As illustrated in FIG. 7, method 700 may include and/or involve the step of coupling a lens stack to a frame of an AR device dimensioned to be worn by a user such that the lens stack is positioned in an optical path of the user (710). Step 710 may be performed in a variety of ways, including any of those described above in connection with FIGS. 1-6 and 8. For example, an AR equipment manufacturer and/or contractor may couple and/or attach a lens stack to a frame of an AR device dimensioned to be worn by a user such that the lens stack is positioned in an optical path of the user.

In some examples, step 710 may include and/or involve one or more sub-steps to achieve the coupling of the lens stack to the frame. For example, and as illustrated in FIG. 7, method 700 may also include and/or involve the sub-step of securing a set of lenses to the frame of the AR device in the optical path (720(1)). Step 720(1) may be performed in a variety of ways, including any of those described above in connection with FIGS. 1-6 and 8. For example, an AR equipment manufacturer and/or contractor may secure and/or couple a set of lenses to the frame of the AR device in the optical path.

In addition, and as illustrated in FIG. 7, method 700 may also include and/or involve the sub-step of securing an optical waveguide between the set of lenses (720(2)). Step 720(2) may be performed in a variety of ways, including any of those described above in connection with FIGS. 1-6 and 8. For example, an AR equipment manufacturer and/or contractor may secure an optical waveguide between the set of lenses. In this example, the optical waveguide may be configured to display and/or present computer-generated and/or AR content to the user. The optical waveguide may be at least partially aligned with the set of lenses in the optical path.

Method 700 may further include and/or involve the step of disposing an RF antenna on a lens included in the set of lenses (730). Step 730 may be performed in a variety of ways, including any of those described above in connection with FIGS. 1-6 and 8. For example, an AR equipment manufacturer and/or contractor may dispose and/or apply an RF antenna on a lens included in the set of lenses via an adhesive. In one example, the adhesive may be provided and/or included on a transparent thin film on which the RF antenna is laid out. In this example, the transparent thin film may effectively couple and/or secure the RF antenna to the lens.

Example Embodiments

Example 1: An AR device comprising (1) a frame dimensioned to be worn on a head of a user and (2) a lens stack coupled to the frame and positioned in an optical path of the user such that the user is able to see through at least a portion of the lens stack, wherein the lens stack comprises (A) a lens, (B) an optical waveguide that (I) is configured to display computer-generated content to the user and (II) is at least partially aligned with the lens, and (C) a radio-frequency antenna disposed on the lens.

Example 2: The AR device of Example 1, wherein the lens stack further comprises an additional lens positioned closer to the head of the user relative to the lens.

Example 3: The AR device of Example 1 or 2, wherein the optical waveguide is positioned between the lens and the additional lens within the lens stack.

Example 4: The AR device of any of Examples 1-3, wherein the radio-frequency antenna is disposed along a perimeter of a see-through area of the lens via a transparent thin film.

Example 5: The AR device of any of Examples 1-4, wherein the transparent thin film is coupled to a side of the lens that faces the user.

Example 6: The AR device of any of Examples 1-5, further comprising a circuit board embedded in the frame, wherein the radio-frequency antenna is communicatively coupled to at least one component disposed on the circuit board via a board-to-board connector attached to the transparent thin film.

Example 7: The AR device of any of Examples 1-6, wherein the circuit board and the board-to-board connector are positioned outside the optical path of the user and embedded in a front-frame portion of the frame.

Example 8: The AR device of any of Examples 1-7, wherein the circuit board and the board-to-board connector are positioned outside the optical path of the user and embedded in a front-frame portion of the frame.

Example 9: The AR device of any of Examples 1-8, further comprising (1) a flexible microphone device and (2) an antenna tuner communicatively coupled between the radio-frequency antenna and a modem disposed on the circuit board, wherein the antenna tuner is incorporated in the flexible microphone device.

Example 10: The AR device of any of Examples 1-9, further comprising an antenna feed communicatively coupled between the radio-frequency antenna and a radio-frequency circuit disposed on the circuit board.

Example 11: The AR device of any of Examples 1-10, wherein the radio-frequency antenna comprises (1) a tuner port communicatively coupled to the antenna tuner and (2) a feed port communicatively coupled to the antenna feed.

Example 12: The AR device of any of Examples 1-11, wherein the lens stack further comprises an eye-tracking device disposed on the additional lens.

Example 13: The AR device of any of Examples 1-12, wherein the eye-tracking device comprises one or more sensors coupled to a side of the additional lens that faces the optical waveguide via a transparent thin film.

Example 14: The AR device of any of Examples 1-13, wherein at least one of the lens and the additional lens comprise a corrective feature configured to mitigate a refractive error in the vision of the user.

Example 15: The AR device of any of Examples 1-14, wherein the radio-frequency antenna comprises a nano-wire meshed structure that is at least partially optically transmissible.

Example 16: The AR device of any of Examples 1-15, wherein the radio-frequency antenna comprises at least one of (1) a loop antenna topology, (2) a ring antenna topology, or (3) a monopole antenna topology.

Example 17: The AR device of any of Examples 1-16, wherein the frame is at least one of (1) opaque to radio frequencies or (2) opaque to visible light.

Example 18: A system comprising (1) an augmented-reality device that comprises (A) a frame dimensioned to be worn on a head of a user and (B) a lens stack coupled to the frame and positioned in an optical path of the user such that the user is able to see through at least a portion of the lens stack, wherein the lens stack comprises (I) a lens, (II) an optical waveguide that is configured to display computer-generated content to the user and is at least partially aligned with the lens, and (III) a radio-frequency antenna disposed on the lens and (2) a computing device communicatively coupled to the augmented-reality device via the radio-frequency antenna disposed on the lens.

Example 19: The system of claim 18, wherein the lens stack further comprises an additional lens positioned closer to the head of the user relative to the lens.

Example 20: A method comprising (1) coupling a lens stack to a frame of an augmented-reality device dimensioned to be worn by a user such that the lens stack is positioned in an optical path of the user by (A) securing a set of lenses to the frame of the augmented-reality device in the optical path and (B) securing an optical waveguide between the set of lenses, the optical waveguide being (I) configured to display computer-generated content to the user and (II) at least partially aligned with the set of lenses in the optical path and (disposing a radio-frequency antenna on a lens included in the set of lenses.

Embodiments of the present disclosure may include or be implemented in conjunction with various types of artificial-reality systems. Artificial reality is a form of reality that has been adjusted in some manner before presentation to a user, which may include, for example, a virtual reality, an AR, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a 3D effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., AR system 900 in FIG. 9) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
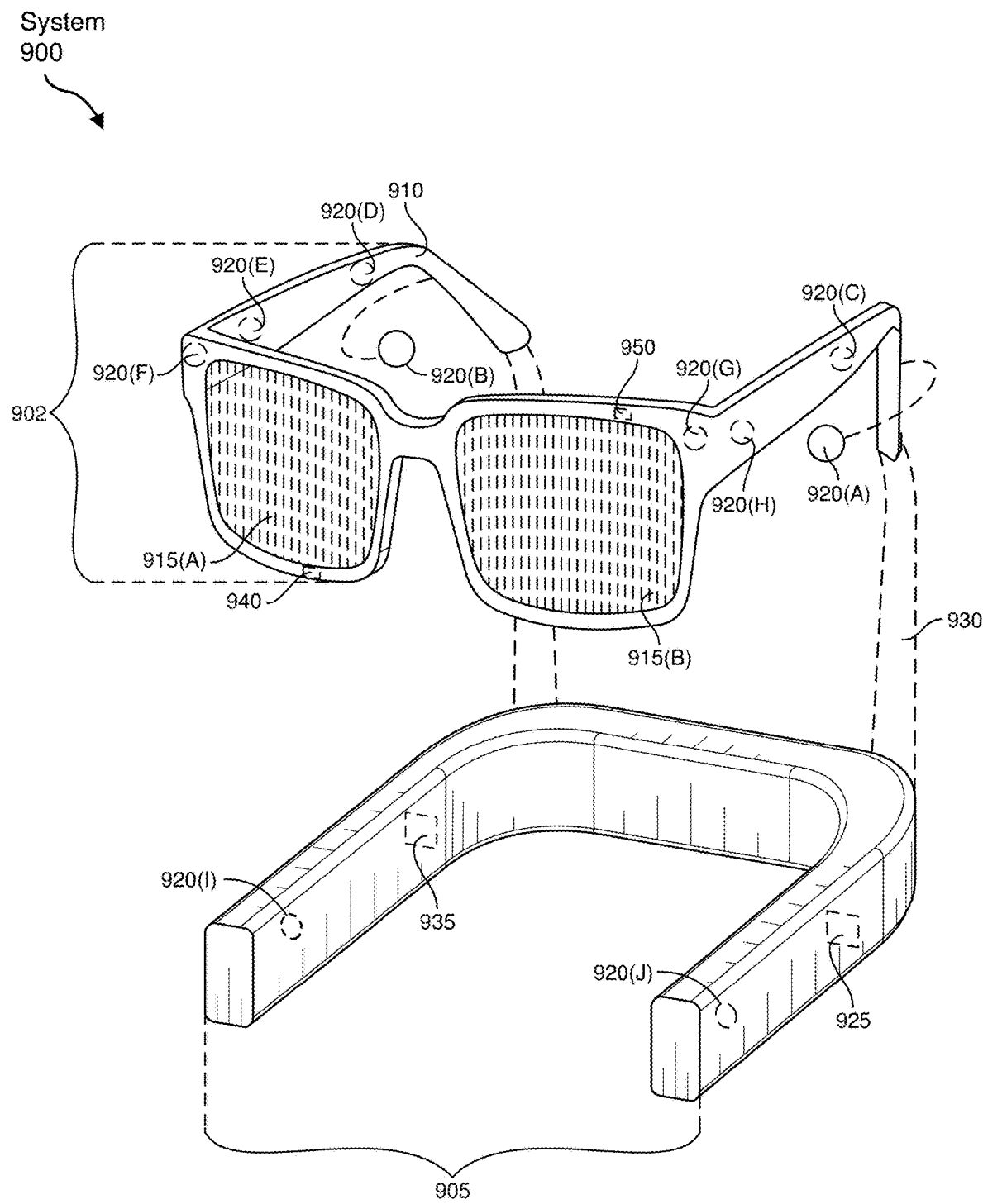
FIG. 9 is an illustration of exemplary augmented-reality glasses that may be used in connection with embodiments of this disclosure.
Figure 10:
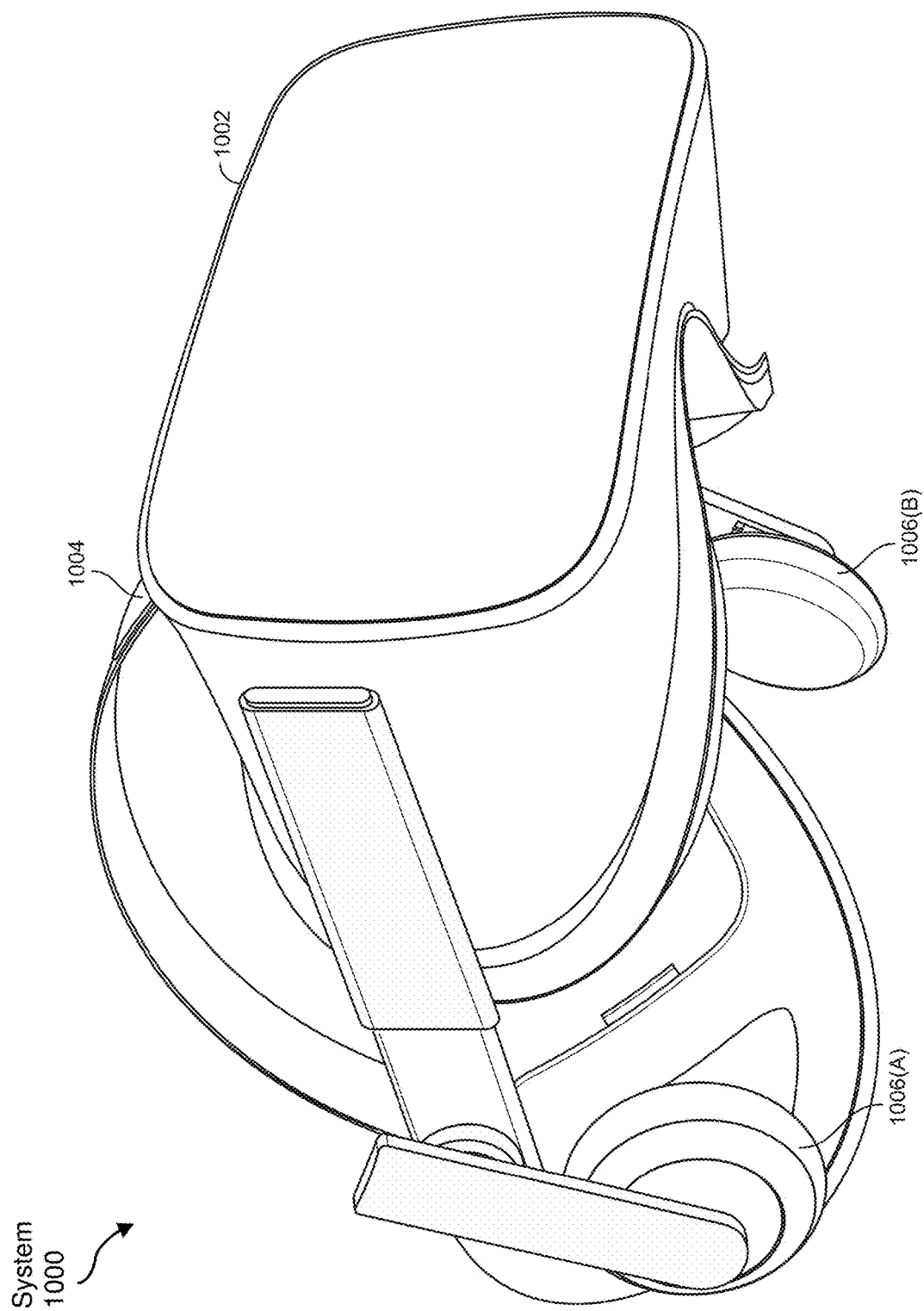
FIG. 10 is an illustration of an exemplary virtual-reality headset that may be used in connection with embodiments of this disclosure.

Turning to FIG. 9, AR system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While AR system 900 includes two displays, embodiments of this disclosure may be implemented in AR systems with a single NED or more than two NEDs.

In some embodiments, AR system 900 may include one or more sensors, such as sensor 940. Sensor 940 may generate measurement signals in response to motion of AR system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, AR system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, AR system 900 may also include a microphone array with a plurality of acoustic transducers 920(A)-920(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 9 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(I) and 920(J), which may be positioned on a corresponding neckband 905.

In some embodiments, one or more of acoustic transducers 920(A)-(J) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While AR system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), AR system 900 may simulate binaural hearing and capture a 3D stereo sound field around a user's head. In some embodiments, acoustic transducers 920(A) and 920(B) may be connected to AR system 900 via a wired connection 930, and in other embodiments acoustic transducers 920(A) and 920(B) may be connected to AR system 900 via a wireless connection (e.g., a BLUETOOTH connection). In still other embodiments, acoustic transducers 920(A) and 920(B) may not be used at all in conjunction with AR system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing AR system 900. In some embodiments, an optimization process may be performed during manufacturing of AR system 900 to determine relative positioning of each acoustic transducer 920 in the microphone array.

In some examples, AR system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with AR eyewear devices may enable the eyewear devices to achieve the form factor of a pair of glasses while still providing sufficient battery and computation power for expanded capabilities. Some or all of the battery power, computational resources, and/or additional features of AR system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to AR system 900. In the embodiment of FIG. 9, neckband 905 may include two acoustic transducers (e.g., 920(1) and 920(J)) that are part of the microphone array (or potentially form their own microphone subarray). Neckband 905 may also include a controller 925 and a power source 935.

Acoustic transducers 920(1) and 920(J) of neckband 905 may be configured to detect sound and convert the detected sound into an electronic format (analog or digital). In the embodiment of FIG. 9, acoustic transducers 920(1) and 920(J) may be positioned on neckband 905, thereby increasing the distance between the neckband acoustic transducers 920(1) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920(D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or AR system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which AR system 900 includes an inertial measurement unit, controller 925 may compute all inertial and spatial calculations from the IMU located on eyewear device 902. A connector may convey information between AR system 900 and neckband 905 and between AR system 900 and controller 925. The information may be in the form of optical data, electrical data, wireless data, or any other transmittable data form. Moving the processing of information generated by AR system 900 to neckband 905 may reduce weight and heat in eyewear device 902, making it more comfortable for the user.

Power source 935 in neckband 905 may provide power to eyewear device 902 and/or to neckband 905. Power source 935 may include, without limitation, lithium-ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in AR system 900 and/or virtual-reality system 1000 may include one or more liquid crystal displays (LCDs), light-emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in AR system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, AR system 900 and/or virtual-reality system 1000 may include one or more optical sensors, such as 2D or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, bodysuits, handheld controllers, environmental devices (e.g., chairs, floor mats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

In some embodiments, the systems described herein may also include an eye-tracking subsystem designed to identify and track various characteristics of a user's eye(s), such as the user's gaze direction. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

Figure 11:
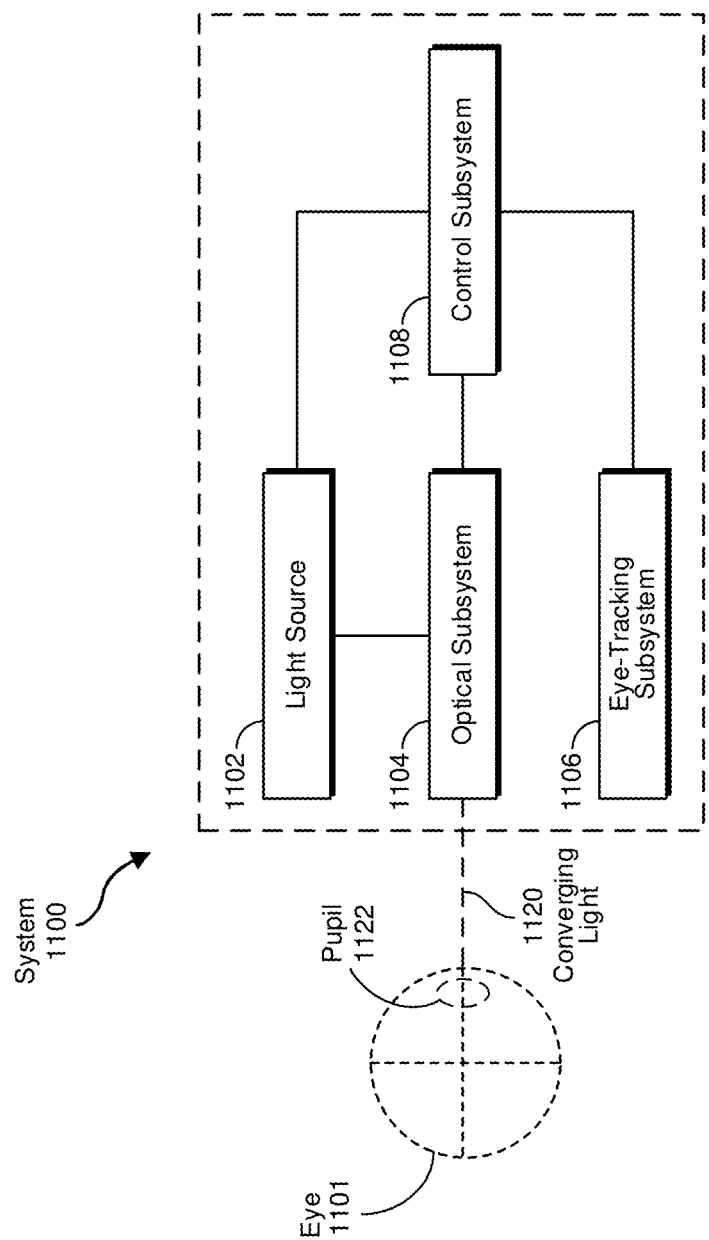
FIG. 11 is an illustration of an exemplary system that incorporates an eye-tracking subsystem capable of tracking a user's eye(s).

FIG. 11 is an illustration of an exemplary system 1100 that incorporates an eye-tracking subsystem capable of tracking a user's eye(s). As depicted in FIG. 11, system 1100 may include a light source 1102, an optical subsystem 1104, an eye-tracking subsystem 1106, and/or a control subsystem 1108. In some examples, light source 1102 may generate light for an image (e.g., to be presented to an eye 1101 of the viewer). Light source 1102 may represent any of a variety of suitable devices. For example, light source 1102 can include a two-dimensional projector (e.g., a LCoS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, which may refer to an optical image formed from the apparent divergence of light rays from a point in space, as opposed to an image formed from the light ray's actual divergence.

In some embodiments, optical subsystem 1104 may receive the light generated by light source 1102 and generate, based on the received light, converging light 1120 that includes the image. In some examples, optical subsystem 1104 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 1120. Further, various mechanical couplings may serve to maintain the relative spacing and/or the orientation of the optical components in any suitable combination.

In one embodiment, eye-tracking subsystem 1106 may generate tracking information indicating a gaze angle of an eye 1101 of the viewer. In this embodiment, control subsystem 1108 may control aspects of optical subsystem 1104 (e.g., the angle of incidence of converging light 1120) based at least in part on this tracking information. Additionally, in some examples, control subsystem 1108 may store and utilize historical tracking information (e.g., a history of the tracking information over a given duration, such as the previous second or fraction thereof) to anticipate the gaze angle of eye 1101 (e.g., an angle between the visual axis and the anatomical axis of eye 1101). In some embodiments, eye-tracking subsystem 1106 may detect radiation emanating from some portion of eye 1101 (e.g., the cornea, the iris, the pupil, or the like) to determine the current gaze angle of eye 1101. In other examples, eye-tracking subsystem 1106 may employ a wavefront sensor to track the current location of the pupil.

Any number of techniques can be used to track eye 1101. Some techniques may involve illuminating eye 1101 with infrared light and measuring reflections with at least one optical sensor that is tuned to be sensitive to the infrared light. Information about how the infrared light is reflected from eye 1101 may be analyzed to determine the position(s), orientation(s), and/or motion(s) of one or more eye feature(s), such as the cornea, pupil, iris, and/or retinal blood vessels.

In some examples, the radiation captured by a sensor of eye-tracking subsystem 1106 may be digitized (i.e., converted to an electronic signal). Further, the sensor may transmit a digital representation of this electronic signal to one or more processors (for example, processors associated with a device including eye-tracking subsystem 1106). Eye-tracking subsystem 1106 may include any of a variety of sensors in a variety of different configurations. For example, eye-tracking subsystem 1106 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 1106 to track the movement of eye 1101. In another example, these processors may track the movements of eye 1101 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking subsystem 1106 may be programmed to use an output of the sensor(s) to track movement of eye 1101. In some embodiments, eye-tracking subsystem 1106 may analyze the digital representation generated by the sensors to extract eye rotation information from changes in reflections. In one embodiment, eye-tracking subsystem 1106 may use corneal reflections or glints (also known as Purkinje images) and/or the center of the eye's pupil 1122 as features to track over time.

In some embodiments, eye-tracking subsystem 1106 may use the center of the eye's pupil 1122 and infrared or near-infrared, non-collimated light to create corneal reflections. In these embodiments, eye-tracking subsystem 1106 may use the vector between the center of the eye's pupil 1122 and the corneal reflections to compute the gaze direction of eye 1101. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, eye-tracking subsystem 1106 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then eye 1101 may act as a retroreflector as the light reflects off the retina, thereby creating a bright pupil effect similar to a red-eye effect in photography. If the illumination source is offset from the optical path, then the eye's pupil 1122 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 1108 may control light source 1102 and/or optical subsystem 1104 to reduce optical aberrations (e.g., chromatic aberrations and/or monochromatic aberrations) of the image that may be caused by or influenced by eye 1101. In some examples, as mentioned above, control subsystem 1108 may use the tracking information from eye-tracking subsystem 1106 to perform such control. For example, in controlling light source 1102, control subsystem 1108 may alter the light generated by light source 1102 (e.g., by way of image rendering) to modify (e.g., pre-distort) the image so that the aberration of the image caused by eye 1101 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the artificial reality systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

Figure 12:
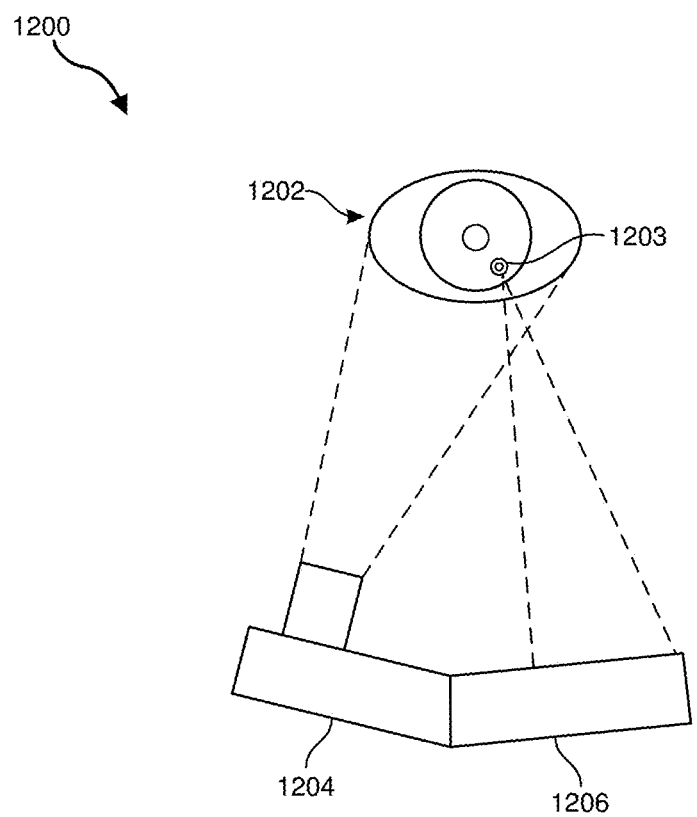
FIG. 12 is a more detailed illustration of various aspects of the eye-tracking subsystem illustrated in FIG. 11.
Figure 12:
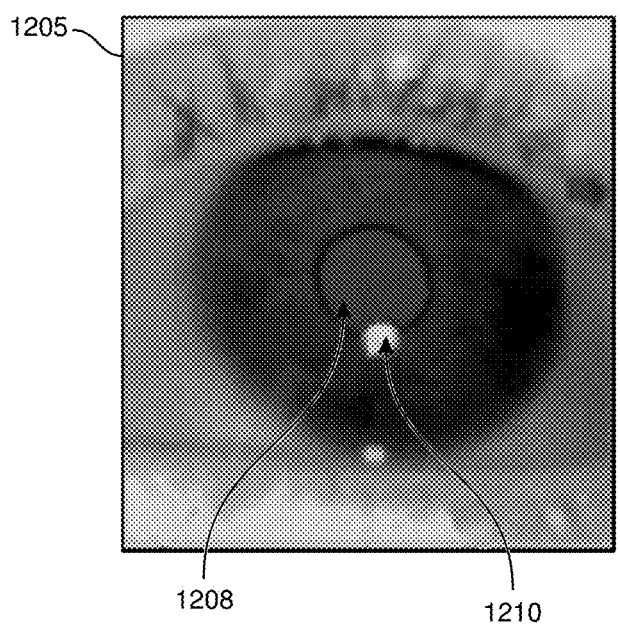

FIG. 12 is a more detailed illustration of various aspects of the eye-tracking subsystem illustrated in FIG. 11. As shown in this figure, an eye-tracking subsystem 1200 may include at least one source 1204 and at least one sensor 1206. Source 1204 generally represents any type or form of element capable of emitting radiation. In one example, source 1204 may generate visible, infrared, and/or near-infrared radiation. In some examples, source 1204 may radiate non-collimated infrared and/or near-infrared portions of the electromagnetic spectrum towards an eye 1202 of a user. Source 1204 may utilize a variety of sampling rates and speeds. For example, the disclosed systems may use sources with higher sampling rates in order to capture fixational eye movements of a user's eye 1202 and/or to correctly measure saccade dynamics of the user's eye 1202. As noted above, any type or form of eye-tracking technique may be used to track the user's eye 1202, including optical-based eye-tracking techniques, ultrasound-based eye-tracking techniques, etc.

Sensor 1206 generally represents any type or form of element capable of detecting radiation, such as radiation reflected off the user's eye 1202. Examples of sensor 1206 include, without limitation, a charge coupled device (CCD), a photodiode array, a complementary metal-oxide-semiconductor (CMOS) based sensor device, and/or the like. In one example, sensor 1206 may represent a sensor having predetermined parameters, including, but not limited to, a dynamic resolution range, linearity, and/or other characteristic selected and/or designed specifically for eye tracking.

As detailed above, eye-tracking subsystem 1200 may generate one or more glints. As detailed above, a glint 1203 may represent reflections of radiation (e.g., infrared radiation from an infrared source, such as source 1204) from the structure of the user's eye. In various embodiments, glint 1203 and/or the user's pupil may be tracked using an eye-tracking algorithm executed by a processor (either within or external to an artificial reality device). For example, an artificial reality device may include a processor and/or a memory device in order to perform eye tracking locally and/or a transceiver to send and receive the data necessary to perform eye tracking on an external device (e.g., a mobile phone, cloud server, or other computing device).

FIG. 12 shows an example image 1205 captured by an eye-tracking subsystem, such as eye-tracking subsystem 1200. In this example, image 1205 may include both the user's pupil 1208 and a glint 1210 near the same. In some examples, pupil 1208 and/or glint 1210 may be identified using an artificial-intelligence-based algorithm, such as a computer-vision-based algorithm. In one embodiment, image 1205 may represent a single frame in a series of frames that may be analyzed continuously in order to track the eye 1202 of the user. Further, pupil 1208 and/or glint 1210 may be tracked over a period of time to determine a user's gaze.

In one example, eye-tracking subsystem 1200 may be configured to identify and measure the inter-pupillary distance (IPD) of a user. In some embodiments, eye-tracking subsystem 1200 may measure and/or calculate the IPD of the user while the user is wearing the artificial reality system. In these embodiments, eye-tracking subsystem 1200 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's inter-pupillary distance, interocular distance, and/or a 3D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the artificial reality system) and analyze a reflection of the dot pattern from each eye of the user to identify a location of each pupil of the user. Accordingly, the eye-tracking subsystem may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position.

Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for rendering adjustments to the virtual scene.

The vergence-processing module may coordinate with the eye-tracking subsystems described herein to make adjustments to the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspect of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems can be incorporated into one or more of the various artificial reality systems described herein in a variety of ways. For example, one or more of the various components of system 1100 and/or eye-tracking subsystem 1200 may be incorporated into AR system 900 in FIG. 9 and/or virtual-reality system 1000 in FIG. 10 to enable these systems to perform various eye-tracking tasks (including one or more of the eye-tracking operations described herein).

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. An augmented-reality device comprising:
   a frame dimensioned to be worn on a head of a user; and
   a lens stack coupled to the frame and positioned in an optical path of the user such that the user is able to see through at least a portion of the lens stack, wherein the lens stack comprises:
      a lens;
      an optical waveguide that:
         is configured to display computer-generated content to the user; and
         is at least partially aligned with the lens; and
      a radio-frequency antenna that is disposed on the lens and comprises a nano-wire meshed structure that is at least partially optically transmissible.

2. The augmented-reality device of claim 1, wherein the lens stack further comprises an additional lens positioned closer to the head of the user relative to the lens.

3. The augmented-reality device of claim 2, wherein the optical waveguide is positioned between the lens and the additional lens within the lens stack.

4. The augmented-reality device of claim 3, wherein the radio-frequency antenna is disposed along a perimeter of a see-through area of the lens via a transparent thin film.

5. The augmented-reality device of claim 4, wherein the transparent thin film is coupled to a side of the lens that faces the user.

6. The augmented-reality device of claim 4, further comprising a circuit board embedded in the frame; and
wherein the radio-frequency antenna is communicatively coupled to at least one component disposed on the circuit board via a board-to-board connector attached to the transparent thin film.

7. The augmented-reality device of claim 6, wherein the circuit board and the board-to-board connector are:
positioned outside the optical path of the user; and
embedded in a front-frame portion of the frame.

8. The augmented-reality device of claim 6, further comprising:
a flexible microphone device; and
an antenna tuner communicatively coupled between the radio-frequency antenna and a modem disposed on the circuit board, wherein the antenna tuner is incorporated in the flexible microphone device.

9. The augmented reality device of claim 8, further comprising an antenna feed communicatively coupled between the radio-frequency antenna and a radio-frequency circuit disposed on the circuit board.

10. The augmented-reality device of claim 9, wherein the radio-frequency antenna comprises:
a tuner port communicatively coupled to the antenna tuner; and
a feed port communicatively coupled to the antenna feed.

11. The augmented-reality device of claim 2, wherein the lens stack further comprises an eye-tracking device disposed on the additional lens.

12. The augmented-reality device of claim 11, wherein the eye-tracking device comprises one or more sensors coupled to a side of the additional lens that faces the optical waveguide via a transparent thin film.

13. The augmented reality device of claim 2, wherein at least one of the lens and the additional lens comprise a corrective feature configured to mitigate a refractive error in the vision of the user.

14. The augmented-reality device of claim 1, wherein the radio-frequency antenna further comprises at least one of:
a loop antenna topology;
a ring antenna topology; or
a monopole antenna topology.

15. The augmented-reality device of claim 1, wherein the frame is at least one of:
opaque to radio frequencies; or
opaque to visible light.

16. A system comprising:
an augmented-reality device that comprises:
a frame dimensioned to be worn on a head of a user; and
a lens stack coupled to the frame and positioned in an optical path of the user such that the user is able to see through at least a portion of the lens stack, wherein the lens stack comprises:
a lens;
an optical waveguide that:
is configured to display computer-generated content to the user; and
is at least partially aligned with the lens; and
a radio-frequency antenna that is disposed on the lens and comprises a nano-wire meshed structure that is at least partially optically transmissible; and
a computing device communicatively coupled to the augmented reality device via the radio-frequency antenna disposed on the lens.

17. The system of claim 16, wherein the lens stack further comprises an additional lens positioned closer to the head of the user relative to the lens.

18. The system of claim 17, wherein the optical waveguide is positioned between the lens and the additional lens within the lens stack.

19. A method comprising:
coupling a lens stack to a frame of an artificial-reality device dimensioned to be worn by a user such that the lens stack is positioned in an optical path of the user by:
securing a set of lenses to the frame of the artificial-reality device in the optical path;
securing an optical waveguide between the set of lenses, the optical waveguide being:
configured to display computer-generated content to the user; and
at least partially aligned with the set of lenses in the optical path; and
disposing a radio-frequency antenna comprising a nano-wire meshed structure that is at least partially optically transmissible on a lens included in the set of lenses.

* * * * *